Feb. 24, 1931. C. T. JOHNSON 1,794,177
APPARATUS FOR UNLOADING CARS
Filed May 22, 1929 2 Sheets-Sheet 2
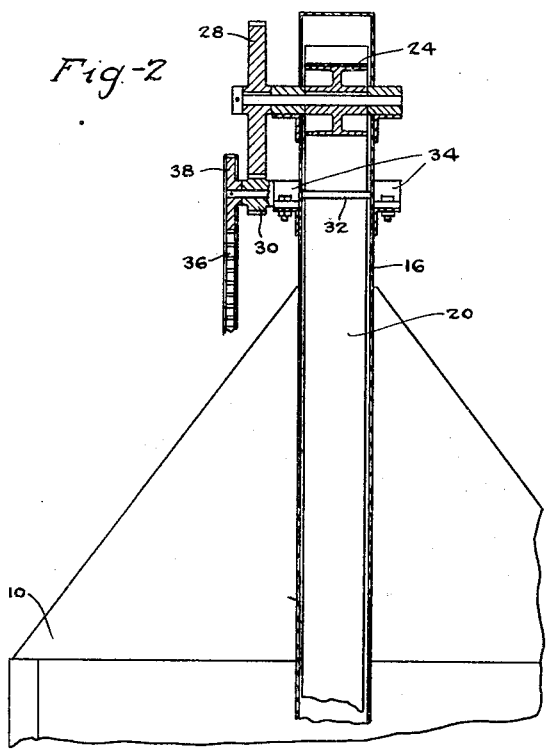
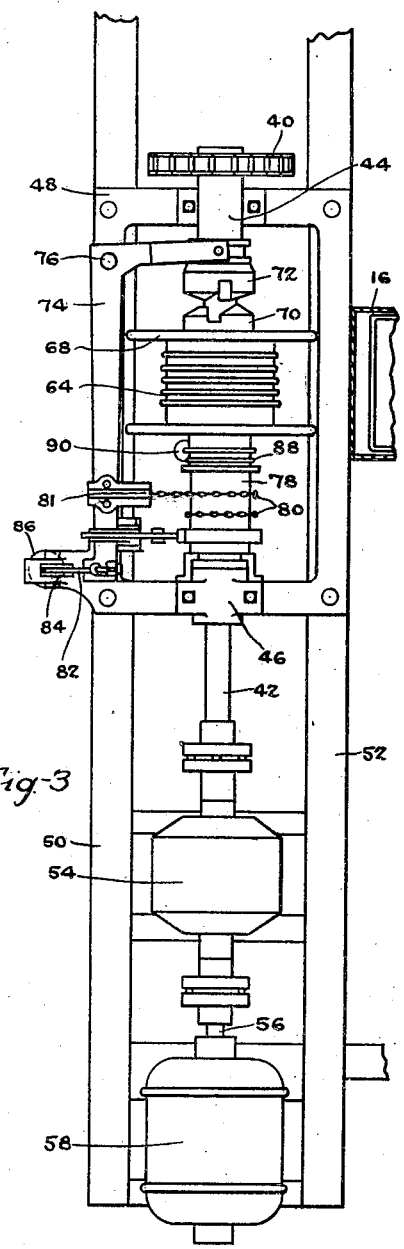
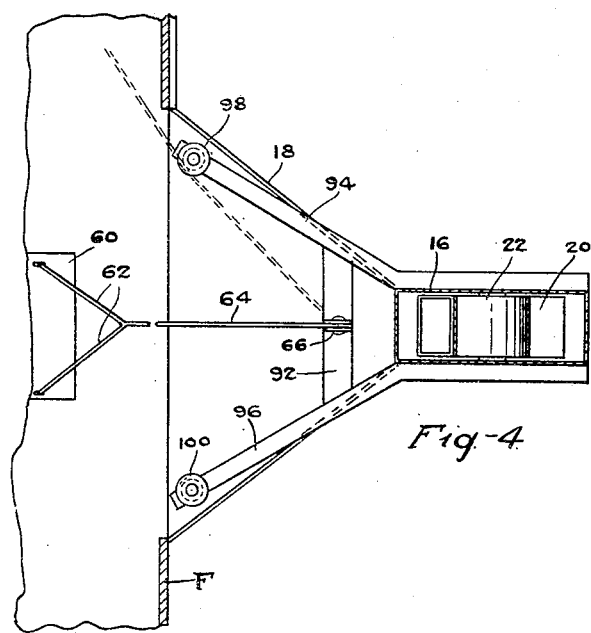
Inventor:
C. T. Johnson.
By Whiteley and Ruckman
Attorneys.

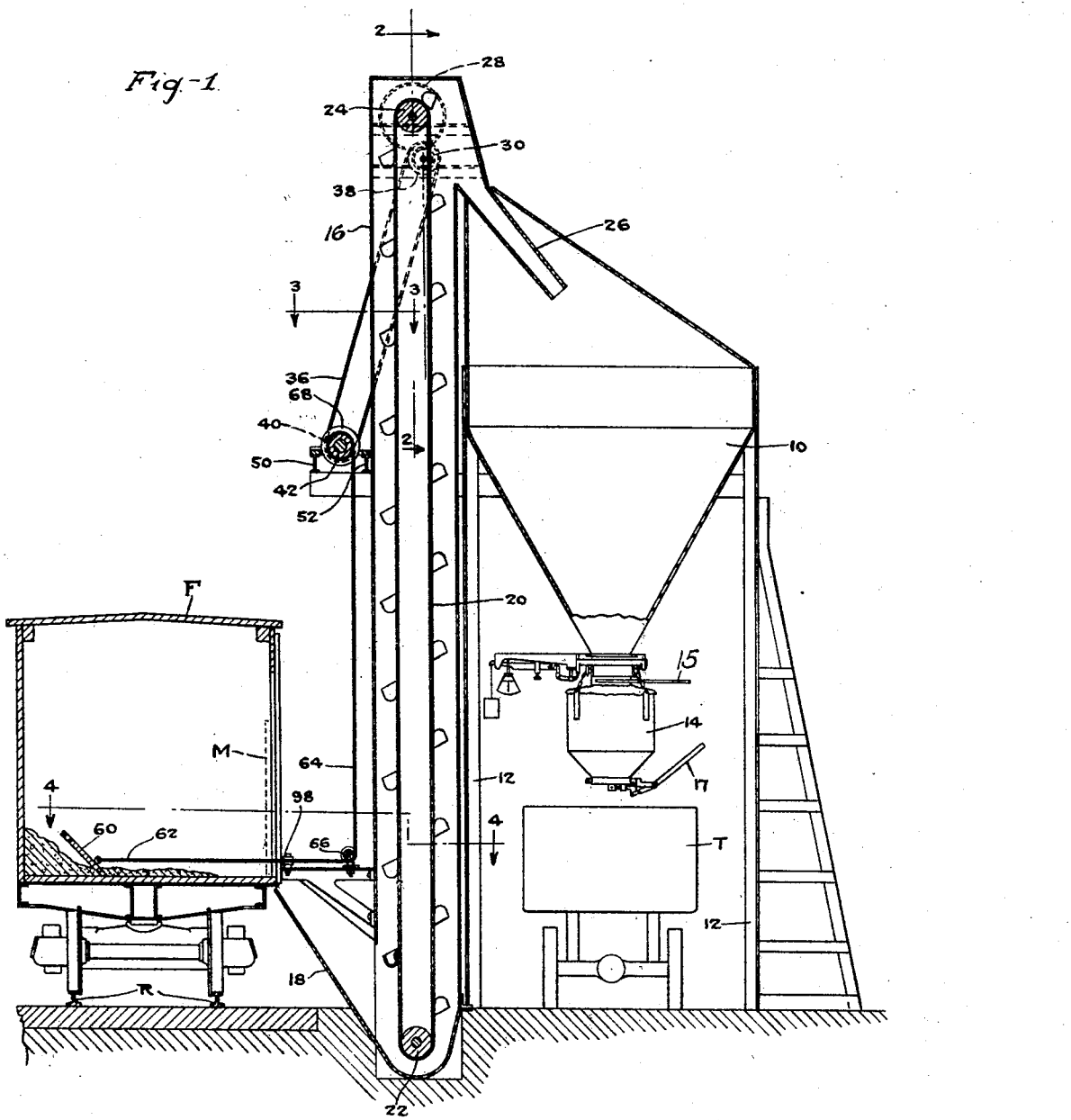

Patented Feb. 24, 1931

1,794,177

UNITED STATES PATENT OFFICE

CLARENCE T. JOHNSON, OF MINNEAPOLIS, MINNESOTA, ASSIGNOR TO DIAMOND IRON WORKS, OF MINNEAPOLIS, MINNESOTA

APPARATUS FOR UNLOADING CARS

Application filed May 22, 1929. Serial No. 365,191.

My invention relates to apparatus for unloading cars. While intended particularly for unloading loose cement from freight cars, it is obvious that the invention may be used for unloading other pulverized and granulated material. An object is to provide means for removing the material from the bottom of the cars and such means may be conveniently operated from the same source of power utilized to elevate the material to a storage receptacle from which it may be discharged in batches into a truck. A particular object is to provide a scoop which is adapted to be pulled by power to the door of the car and then be automatically stopped just inside the door.

The full objects and advantages of my invention will appear in connection with the detailed description thereof, and the novel features of my inventive idea will be particularly pointed out in the claims.

In the accompanying drawings which illustrate a practical embodiment of my invention in one of the forms in which it may be embodied,—

Fig. 1 is a sectional elevational view of the apparatus. Fig. 2 is a view in vertical section on the line 2—2 of Fig. 1. Fig. 3 is a view in horizontal section on the line 3—3 of Fig. 1. Fig. 4 is a view in horizontal section on the line 4—4 of Fig. 1.

Referring to the construction shown in the drawings, a storage hopper or receptacle 10 is supported in elevated position by uprights 12. Attached to the lower end of the hopper 10, there is a batch-forming device 14 of well known construction and hence not described in detail, it being merely necessary to note that there is an upper slide 15 and a lower closure which is opened by a lever 17 so that the desired batch may be weighed out from the material in the hopper and then discharged into a truck T while standing under the device 14. Extending up adjacent the hopper 10, there is a vertical casing 16, the lower end of which has a chute 18 connected therewith. An endless bucket conveyor 20 runs around a pulley 22 mounted in the lower portion of the casing 16 and around a pulley 24 mounted in the upper portion of the casing 16. A discharge chute 26 leads from the upper portion of this casing into the top of the hopper 10. A gear 28 secured outside of the casing 16 to the shaft of the pulley 24 meshes with a smaller gear 30 secured to a shaft 32 mounted in bearings 34 secured to the casing. A sprocket chain 36 runs around a sprocket wheel 38 secured to the shaft 32 and around a sprocket wheel 40 secured to one end of a shaft 42. As will be understood from Fig. 3, the shaft 42 is mounted in bearings 44 and 46 carried by a frame member 48 mounted on horizontal bars 50 and 52. The shaft 42 is driven through reduction gearing contained in a gear housing 54 by means of the shaft 56 of a motor 58 supported by the bars 50 and 52. As shown in Fig. 1, the chute 18 is arranged so as to lie just underneath the doorway of a freight car F adapted to travel on railway tracks R. When the door is opened, and a member M which is positioned in the doorway is displaced, the material will run down the chute 18 and be delivered by the conveyor to the hopper 10. In order to remove the material from the bottom of the car, I employ a scoop 60 having two converging flexible elements or chains 62 secured to the respective sides thereof. One end of a rope 64 is adapted to be attached in well known manner to the joined ends of the elements 62. The rope 64 passes underneath a swively mounted pulley 66 and extends up to a drum 68 upon which it is adapted to be wound. The drum 68 is loosely mounted on the shaft 42 while one end of the drum carries a clutch member 70 with which is adapted to cooperate a clutch member 72 feathered on the shaft 42. The clutch member 72 is engaged by one end of a shifting lever 74 intermediately pivoted at 76 to the frame 48. A drum 78 which is shown as being smaller than the drum 68 is secured to one end thereof. A chain 80 adapted to wind on the drum 78 has one of its end portions secured thereto and the other of its end portions secured to a hook 81 carried by the operating arm of the lever 74 toward its end. The end of the operating arm has a rope 82 secured thereto, this rope passing over a pulley 84 and supporting a weight 86. A rope 88 is wound on a portion of the drum 78 in the opposite direction from which the rope 64 is wound on the drum 68. The free end of the rope 88 carries a counterweight 90. By referring to Fig. 4, it will be noted that the swivelled pulley 66 is carried by a cross bar 92 extending between diverging arms 94 and 96 carried at the top of the chute 18. The end of the arm 94 carries a roller 98 while the end of the arm 96 carries a roller 100. When the scoop 60 is moved from a position toward the ends of the car, the rollers 98 and 100 serve to guide the rope 64.

The operation and advantages of my invention will be obvious in connection with the foregoing description. Upon opening the door of the car and displacing the member M, the material in the car will run down the chute 18 and be carried up by the conveyor 20 and deposited in the hopper 10. From the hopper 10, the desired weight of material for a batch may be allowed to run into the batch-forming device and then discharged into a truck which is located underneath. It will be understood as a matter of course that during the time when material is running out of the car by gravity, the clutch member 72 is disengaged from the clutch member 70. When no more material will run out of the car by gravity, the scoop 60 is utilized in a manner now to be described. After securing one end of the rope 64 to the scoop chains 62, the scoop is placed at the point in the car door where it should stop when bringing its load for delivery to the chute 18. The other end of the rope 64 is passed under the pulley 66 and the loose end of the rope is wound around the drum 68 and secured thereto. The chain 80 is wound around the smaller drum 78 and its free end is secured to the hook 81 of the shifting lever 74 so that there is a tendency to keep the clutch members disengaged. The rope 82 carrying the weight 86 is attached to the end of the lever 74. The rope 88 carrying the counterweight 90 is attached to the drum 78 on the side opposite that on which the rope 64 leads to the drum 68 so that as one of these ropes unwinds, the other one winds up. The counterweight 90 should hang sufficiently low so that when the rope 64 is all unwound from the drum, the counterweight will be at its highest point. When the operator puts the scoop into the material which is to be moved and delivered out of the car door, he gives the rope 64 a sharp jerk, thus causing sufficient slack in the rope to allow the counterweight 90 to reverse the movement of the drum, thereby freeing the shifting lever 74 so that the weight 86 brings the clutch member 72 into engagement with the clutch member 70. The operation of the motor thereupon causes the rope 64 to be wound up on its drum so as to pull the scoop to the door of the car. Since the device was set with the scoop just inside the door, when the scoop reaches this place, the chain 80 will have been wound again on its drum thereby pulling the shifting lever so as to disengage the clutch. A new rope tends to stretch and leave the scoop too far back in the car. When this occurs, the rope is unwound from the drum and then wound again thereon so as to take up the stretch.

I claim:

1. An apparatus for unloading cars comprising a vertically disposed endless conveyor, a discharge chute for the upper end of said conveyor, a chute leading to the lower end of said conveyor, said latter chute adapted to have its upper end disposed underneath the door of a freight car, a motor, a shaft driven by said motor, driving connections between said shaft and said conveyor, a drum loosely mounted on said shaft, a clutch member carried by said drum, a cooperating clutch member feathered on said shaft, a shifting lever engaging said cooperating clutch member, a second drum attached to said first drum, a rope carrying a counterweight at one end and having its other end secured to said second drum, a chain attached at one end to said second drum and attached at the other end to said shifting lever, a rope secured to the end of said shifting lever, a pulley over which said rope passes, a weight attached to the lower end of said rope, a scoop adapted to be placed in the car, and a rope attached at one end to said scoop and having its other end adapted to wind on said first mentioned drum in the opposite direction from that in which the rope carrying said counterweight is wound.

2. An apparatus for unloading cars comprising a conveyor adapted to have its receiving end disposed adjacent the door of a freight car, a motor for operating said conveyor, a shaft driven by said motor, a drum device loosely mounted on said shaft, a clutch member carried by said drum device, a cooperating clutch member feathered on said shaft, a shifting lever engaging said cooperating clutch member, a flexible element carrying a counterweight at one end and having its other end secured to said drum device, a second flexible element attached at one end to said drum device and attached at its other end to said shifting lever, a third flexible element secured to the operating end of said shifting lever, a pulley over which said third flexible element passes, a weight attached to the lower end of said flexible element, a scoop adapted to be placed in the car which is to be unloaded, and a fourth flexible element attached at one end to said scoop and having its other end adapted to wind on said drum device in the opposite direction from that in which said first mentioned flexible element is wound on said drum device.

3. An apparatus for unloading cars comprising a motor, a shaft driven by said motor, a drum device loosely mounted on said shaft, a clutch member carried by said drum device, a cooperating clutch member feathered on said shaft, a shifter engaging said cooperating clutch member, a flexible element carrying a counterweight at one end and having its other end secured to said drum device, a second flexible element attached at one end to said drum device and attached at its other to said shifter, a third flexible element secured to the operating end of said shifter, a pulley over which said third flexible element passes, a weight attached to the lower end of said third flexible element, a scoop adapted to be placed in the car which is to be unloaded, and a fourth flexible element attached at one end to said scoop and having its other end adapted to wind on said drum device in the opposite direction from that in which said first mentioned flexible element is wound on said drum device.

4. In an unloading device, the combination of a shaft, means for driving said shaft, a drum device loosely mounted on said shaft, a clutch member carried by said drum device, a cooperating clutch member feathered on said shaft, a shifter engaging said cooperating clutch member, a flexible element carrying a counterweight at one end and having its other end secured to said drum device, a second flexible element attached at one end to said drum device and attached at its other end to said shifter, a third flexible element secured to the operating end of said shifter, a pulley over which said third flexible element passes, a weight attached to the lower end of said third flexible element, a scoop adapted to be placed in the material which is to be unloaded, and a fourth flexible element attached at one end to said scoop and having its other end adapted to wind on said drum device in the opposite direction from that in which said first mentioned flexible element is wound on said drum device.

5. In an unloading device, the combination of a shaft, means for driving said shaft, a drum device loosely mounted on said shaft, a clutch member carried by said drum device, a cooperating clutch member feathered on said shaft, a shifter engaging said cooperating clutch member, a flexible element carrying a counterweight at one end and having its other end secured to said drum device, a second flexible element attached at one end to said drum device and attached at its other end to said shifter, said second flexible element when wound on said drum device serving to hold said clutch members disengaged from each other, means connected with said shifter for bringing said clutch members into engagement with each other when said second flexible element is unwound, a scoop adapted to be placed in the material which is to be unloaded, and a flexible element attached at one end to said scoop and having its other end adapted to wind on said drum device in the opposite direction from that in which said first mentioned flexible element is wound.

In testimony whereof I hereunto affix my signature.

CLARENCE T. JOHNSON.